Feb. 11, 1936.  O. C. TRAVER ET AL  2,030,665
PROTECTIVE APPARATUS
Filed April 26, 1934
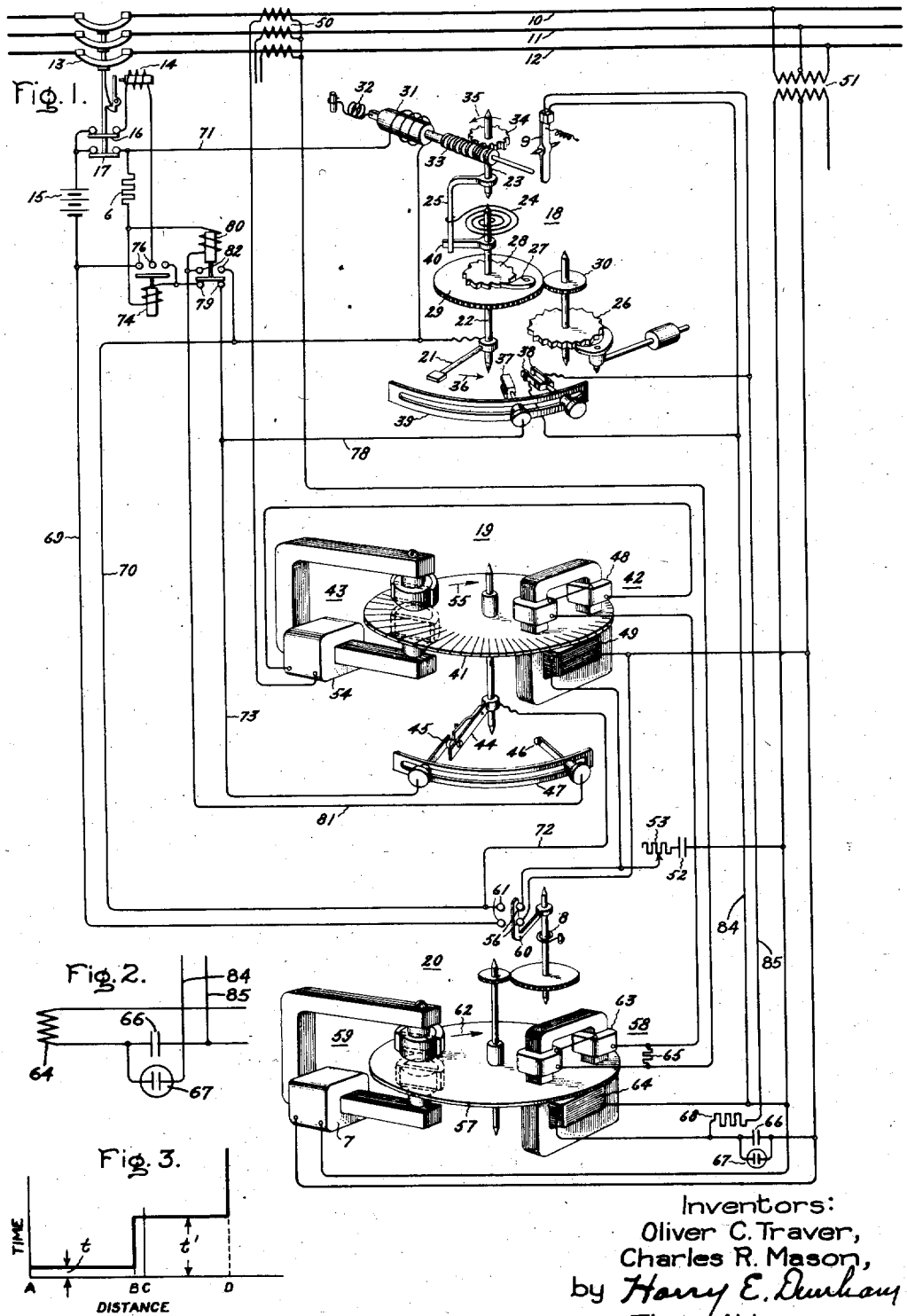
Inventors:
Oliver C. Traver,
Charles R. Mason,
by Harry E. Dunham
Their Attorney.

Patented Feb. 11, 1936

2,030,665

UNITED STATES PATENT OFFICE 2,030,665

PROTECTIVE APPARATUS

Oliver C. Traver, Drexel Hill, and Charles R. Mason, Media, Pa., assignors to General Electric Company, a corporation of New York Application April 26, 1934, Serial No. 722,516

18 Claims. (Cl. 175—294)

Our invention relates to improvements in protective apparatus for electric systems and more particularly to protective apparatus wherein selective action is obtained on a graduated time basis dependent on the position of a fault and an object of our invention is to provide improved fault responsive protective apparatus whereby to prevent operation during conditions which present many of the characteristics of faults but which actually are not, as for example high current and low voltage during power swings following a shock to the system to be protected. A shock to an electric system is, in general, an abrupt change such as may be caused by faults, switching operations or sudden changes in load.

When, for example, directional-distance relays are employed on electric systems for protective purposes, certain conditions following shocks may affect the relays the same as faults. During a fault the current, voltage and power factor conditions initially are such as to cause the correct operation of the relay because the relay is so designed. By virtue of this fact, however, the occurrence of such conditions accompanying power oscillations or swings, such as may follow a disturbance on a transmission line, for example the clearing of a fault or the switching in or out of a large quantity of power, affects the relay much the same as a fault. Consequently, false relay operation may occur. There is, however, the distinction that the current, voltage and power factor conditions which exist after a fault and which can cause relay operation do not occur until after a longer time in case of power swings. In accordance with our invention, we provide means such that if the conditions to which the relay is designed to respond appear initially, the relay characteristic will be altered to provide first greater sensitivity to operation throughout the remainder of the fault and then decreased sensitivity.

Our invention will be better understood from the following description when considered in connection with the accompanying drawing and its scope will be pointed out in the appended claims.

In the accompanying drawing, Fig. 1 illustrates schematically, partly in diagram and partly in perspective, protective apparatus embodying our invention, Fig. 2 shows a modification of a part of the embodiment of our invention shown in Fig. 1, and Fig. 3 is a time-distance characteristic diagram explanatory of our invention.

In Fig. 1, there is illustrated an embodiment of our invention as applied to the protection of a three-phase circuit having phase conductors 10, 11 and 12. This circuit is arranged to be controlled by suitable circuit interrupting means such as a circuit breaker 13 of the latched closed type, the opening of which can be effected by the energization of the trip coil 14 from a suitable source, such as a battery 15. The circuit breaker 13 may also be provided with auxiliary switches 16 and 17, which are closed when the circuit breaker is closed, for interrupting certain control circuits as will hereinafter appear. While there is shown only a portion of the three-phase circuit, it will be understood that this may form a part of an electric system. Also the circuit may be divided into sections by circuit breakers located at certain points, such as generating stations, sub-stations, etc., as is well known to the art.

For controlling the circuit breaker 13 on the occurrence of a fault, such for example as a short circuit between any two of the phase conductors 10, 11 and 12, there is illustrated a stepped time characteristic directional-distance relay which is in general of the type disclosed in U. S. Letters Patent 1,919,969, issued July 25, 1933. This relay comprises a plurality of cooperating means or units which include a timing means 18, an ohmic means such as an ohmmeter 19 operable in accordance with an ohmic characteristic of the circuit 10, 11 and 12 and a starting means 20 also operable in accordance with an ohmic characteristic of the circuit and means controlled conjointly by the timing, ohmic and starting means for effecting the opening of the circuit breaker 13 in different definite times dependent on the location of the fault.

The timing means 18 may be of any suitable type and is preferably such as to require the minimum attention necessary to certainty of operation. To this end the energization of the timing means is automatically controlled. Also the timing means is preferably of a substantially constant speed type in order to obtain definite times. As shown, the timing means 18 is of the escapement type and includes a controlling member 21 which is secured to a shaft 22 and which is movable to a plurality of contact controlling positions. The shaft 22 is interconnected with a suitable actuating mechanism, which includes a shaft 23, through suitable energy storing means such as a spring 24 whose ends are secured respectively to the shaft 22 and to a crank 25 rigidly mounted on the shaft 23. The shaft 22 is also interconnected with an escapement mechanism 26 through a pawl 27 and a ratchet 28 in order to insure a quick return of the movable member 21 independently of the escapement mechanism. The ratchet 28 is secured to the shaft 22 so as to rotate therewith and engages the pawl 27 which is carried by a gear 29 loosely mounted on the shaft 22 and engaging the pinion 30 of the escapement mechanism 26.

In order to wind or store energy in the spring 24, there is provided an electromagnetic motor mechanism 31 which, when energized, overcomes the bias of a return spring 32 and through the rack 33 and the pinion 34 turns the crank 25 in the direction indicated by the arrow 35. As the energy thus quickly stored in the spring 24 is slowly dissipated by reason of the escapement mechanism 26, the member 21 is moved in the direction indicated by the arrow 36. For the desired contact controlling operation, the path of movement of the member 21 includes a contact 37 and a pair of cooperating contacts 38 which are adjustably positioned on a suitably graduated time scale 39 as shown. The contact 37 may be of the passing type as shown and in accordance with our invention the contacts 38, which are normally open, are so positioned relatively to the contact 37 that the contacts 38 are caused to engage each other by the movement of the controlling member 21 substantially immediately after this member disengages the contact 37. Also in accordance with our invention the timing means includes a contact controlling means 9 whose contacts are normally closed, that is to say when the motor mechanism 31 is deenergized. These contacts, however, are immediately opened when the motor mechanism 31 is energized. When the electromagnetic motor means 31 is deenergized, the crank 25 under the bias of the spring 32 is quickly turned in a direction opposite that indicated by the arrow 35. In this direction of movement the crank 25 engages an arm 40 on the shaft 22 and, since this shaft can turn in such direction independently of the escapement 26, the member 21 is quickly returned to its initial position and the contact controlling means 9 closes its contacts. The return motion is limited by the travel of the rack 33 or the plunger of the electromagnet 31 coupled thereto.

The ohmic unit or ohmmeter 19 may be of any suitable type, the one chosen for illustration being of the induction disk type. As shown, it includes a movable member such as the slotted disk 41 which is constructed and arranged to take a position dependent on an ohmic characteristic, such as the impedance, resistance or reactance of the circuit 10, 11, 12 or a portion thereof. In certain applications of our invention it may be preferable to use the reactance of the circuit. For this purpose there may be provided, as shown, two cooperating electromagnetic motor elements 42 and 43 which are respectively directional and non-directional and whose torques are respectively proportional to EI sin $\phi$ and I$^2$, E and I respectively being the voltage of the circuit and the current in a phase conductor of the circuit and $\phi$ the phase angle between them. When these torques are opposed, the disk 41, because of its slotting, comes to a position of equilibrium. The deflection of the disk, that is its movement from an initial position, is, therefore, proportional to $$\frac{EI \sin \phi}{I^2} = \frac{E}{I} \sin \phi = Z \sin \phi = X,$$

Z and X being respectively the impedance and reactance of the part of the circuit in question. Associated with the disk 41 so as to be movable therewith is a controlling member 44 in the path of movement of which one or more contacts 45 and 46 are arranged. These may be adjustably positioned on a suitably graduated ohmic or distance scale 47 as shown. Permanent drag magnets, not shown, may be employed to steady the disk 41.

The motor element 42 is of the wattmetric type and includes cooperating current and voltage windings 48 and 49 respectively which are respectively connected to be energized in accordance with the current in the phase conductor 10 and the voltage between the phase conductors 10 and 11 by suitable means such as a current transformer 50 and a potential transformer 51. In order to obtain the desired phase relation between the currents in the windings 48 and 49, suitable phase displacing means, such as the condenser 52 is provided. A variable resistance 53 connected in series with the voltage winding 49 may be employed to adjust the torque of the wattmetric element 42.

The motor element 43 may be of the shaded pole non-directional type, as shown. Its main winding 54 is connected to be energized in accordance with the current in the phase conductor 10. The torque exerted by this current element is in the direction indicated by the arrow 55 and under predetermined circuit conditions is opposed by the torque of the element 42. The nature of the protection desired will, of course, govern but the torques of the elements 42 and 43 may be opposed when, with power factor leading, the power is in one direction and with the power factor lagging the power is in the reverse direction.

In order to obtain quick operation during faults, the ohmmeter 19 is so controlled that its contact controlling member 44 is normally maintained in the position of minimum ohms where it is held by the torque of the current operated element 43 with the member 44 engaging the contact 45. For this purpose the motor element 42 is rendered normally inoperative in any suitable manner, for example by short-circuiting its high impedance voltage winding through contacts 56 controlled by the starting unit 20. This also eliminates unnecessary heating of the voltage winding besides reducing the normal burden of the potential transformer 51.

The starting unit 20 may be of any suitable type, the one chosen for illustration being of the induction disk type. As shown, it includes a movable member such as a disk 57 which is constructed and arranged to take a controlling position dependent on an ohmic characteristic of the circuit 10, 11, 12 or a portion thereof, such as the impedance or a component of the impedance in the direction of the resistance or reactance axis or some axis at an angle $\alpha$ to the resistance axis. In some applications it may be preferable to use the impedance component at the angle $\alpha$. For this purpose there may be provided, as shown, two cooperating electromagnetic motor elements 58 and 59 which are respectively directional and non-directional and whose torques are respectively proportional to EI cos $(\alpha-\phi)$ and E$^2$, E and I respectively being the voltage of the circuit and the current in a phase conductor of the circuit, $\phi$ the phase angle between them and $\alpha$ an angle whose value is determined in accordance with the particular operation desired. Associated with the disk 57 so as to be movable therewith is a controlling member 60 in the path of movement of which are arranged the contacts 56 and also contacts 61. Permanent drag magnets, not shown, may be used to steady the disk 57. In order to prevent unnecessary tripping, the member 60 may be biased away from contacts 61 by a light spring 8.

The restraining motor element 59 is of the shaded pole non-directional type. Its main winding 7 is connected to be energized in accordance with the voltage between the phase conductors 10 and 11. The torque exerted by the voltage element is in the direction indicated by the arrow 62, that is in a direction to move the controlling member 60 to close the contacts 56.

The operating motor element 58 is of the power directional wattmetric type. As shown, it includes cooperating current and voltage windings 63 and 64 respectively, which are respectively connected to be energized in accordance with the current in phase conductor 10 and the voltage between the phase conductors 10 and 11. In order to obtain the desired phase relation between the currents and the windings suitable phase displacing means, such as a resistance 65 in parallel with the current winding 63, may be provided.

In order to obtain a high degree of sensitivity of the starting unit, particularly on low impedance faults, there may be connected in series with the voltage winding 64 a condenser 66 forming therewith a series resonant circuit at the operating frequency of the circuit 10, 11, 12. Further in order to control the sensitivity in accordance with predetermined conditions, there is provided suitable control means such as a glow discharge valve 67. This device is such that at normal voltage it breaks down the bypass of the condenser 67 whereby the resonant feature is eliminated.

In case of a fault, such as a short circuit between two phase conductors, there is initially little or no arc at the point of fault. The power factor of the fault current is then determined solely by the system impedance which is usually highly inductive. However, an arm may develop and rapidly extend. If it does, the resistance component of the total apparent impedance at the relay is increased accordingly. This reduces the total fault current and increases the power factor. Such action differs from power swings wherein the power factor is initially high and the current low.

In accordance with our invention, we provide means for causing the relay to distinguish between power swings and faults whereby, after the initial starting indication and until the expiration of the maximum fault duration to be expected, the starting unit is made more sensitive to arc lengthening. This increased sensitivity may be obtained by increasing the input to the starting unit or changing the angle of maximum torque, or both. Thus, if it be assumed that the directional element 58 of the starting unit 20 has its maximum torque at some predetermined angle between the current and the voltage energizing the windings 63 and 64 respectively, then this angle of maximum torque can be varied to alter the torque, for example, by connecting in circuit with the potential winding 64 suitable phase displacing means such as a resistance 68 which is under the control of the contacts 9 and 38. The control of these contacts is such that the circuit containing the resistance 68 is quickly opened by the contact 9 to provide, under the angular relations existing during a fault which includes an extending arc, increased torque in the starting unit until the ohm unit has had time to determine whether the fault is beyond its operating range, for example beyond the distance AD shown in Fig. 3. Immediately following the expiration of this time $t'$ the contacts 38 are closed to connect the resistance 68 in parallel with the potential coil 64 whereby to desensitize the starting unit. The starting unit may then reset and be in condition to respond to faults but not to swings because of the high power factor and low current therein involved.

Instead of varying the sensitivity by the arrangement as shown in Fig. 1, we may arrange the glow tube 67 in series with the leads 84 and 85 to the contacts 9 and 38, as shown in Fig. 2. Thus, with either of these contacts closed, the glow tube 67 is operative to detune the circuit of the potential winding 64 if the voltage across the condenser 66 is high enough to discharge the glow tube. Either the opening of the contacts 9 or a drop in potential allows the circuit of the winding 64 and the condenser 66 to resonate. This, in effect, increases the voltage applied to the winding 64 and also changes its phase angle, although an arrangement which does either of these alone falls within the intent of our invention.

With power flow in the circuit 10, 11, 12 in a given direction, for example toward the station bus where the relay is located, the torques of the motor elements 58 and 59 are cumulative and tend to maintain the contacts 56 closed. Upon the occurence of a fault anywhere between A and some point to the right of A and with power flow away from the bus, the torques are opposed. The torque of the power directional element 58 then predominates and the contacts 56 are opened and the contacts 61 closed. This renders the ohnmeter 19 operative by removing the short circuit from the potential winding 49. The closing of the contacts 61 completes the circuit of the motor mechanism 31 of the timing means 18 from one side of the battery 15 to the other as follows: The conductor 69, the contacts 61, the conductor 70, the winding of the mechanism 31, the conductor 71 and the circuit breaker auxiliary switch 17 thereby starting the timing means which opens its contacts 9 to render the starting unit more sensitive.

It will first be assumed that the fault is within the range of the minimum ohm setting of the ohmmeter 19 or somewhere between the circuit breaker location A and a point B to the left of the station C, see Fig. 3. Under these conditions the controlling member 44 of the ohmmeter engages the contact 45 and the circuit breaker 13 is tripped in the minimum time $t$, that is the time it takes the starting means 20 to operate. The circuit of an auxiliary tripping relay 74 is completed from one side of the battery 15 to the other as follows: The conductor 69, the contacts 61, the conductor 72, the controlling member 44, the contact 45, the conductor 73, the contacts 79 of a transfer relay 80, the winding of the auxiliary tripping relay 74, the current limiting resistance 6 and the circuit breaker auxiliary switch 17. The auxiliary relay 74 upon energization closes its contacts 76 in the circuit of the trip coil 14 and insures positive tripping of the circuit breaker without any danger from fluttering of the contacts of the distance relay.

It will now be assumed that the fault is within the range of a higher ohm setting of the ohmmeter 19 or somewhere between B and a point D. Under these conditions the controlling member 44 of the ohmmeter 19 quickly takes a position intermediate the contacts 45 and 46 while the contact member 60 is moving from the contacts 56 to the contacts 61. After a predetermined definite time, $t'$, however, the contact controlling member 21 of the timing means 18 engages the contact 37. This completes the circuit of the auxiliary tripping relay 74 from one side of the battery 15 to the other as follows: the conductor 69, the contacts 61, the conductor 70, the controlling member 21, the contact 37, the conductor 78, the contacts 79 of the transfer relay 80, the winding of the tripping relay 74, the resistor 6 and the circuit breaker auxiliary switch 17. As before, the auxiliary tripping relay 74 upon energization seals itself in through its contacts 76 and effects the energization of the trip coil 14.

It will now be assumed that the fault is within the range of a still higher ohm setting of the ohmmeter 19 or somewhere to the right of D, see Fig. 3. Under these conditions, the controlling member 44 of the ohmmeter engages the contact 46 thereby completing the circuit of the winding of the transfer relay 80 from one side of the battery 15 to the other as follows: The conductor 69, the contacts 61, the conductor 72, the controlling member 44, the contact 46, the conductor 81, the winding of the transfer relay 80, the resistance 6 and the circuit breaker auxiliary switch 17. Upon energization, the transfer relay 80 seals itself in through its contacts 82 which are in series with the contacts 61. Inasmuch as the transfer relay contacts 79 which are in the circuit of the tripping relay 74 are now open and will remain open as long as the contacts 61 are closed, the auxiliary tripping relay 74 cannot be energized to effect the tripping of the circuit breaker. Thus, for faults to the right of the point D, no tripping will occur.

If, however, the contact controlling member 44 of the ohmmeter 19 indicates back-up ohms, that is beyond D, by engaging the contact 46 and, because of a swing initiated by the fault, the starting unit has not reset so as to open its contacts 61, then the circuit controlling member 21 goes past the contact 37 to engage and close the contacts 38. This completes the circuit of the resistance 68 thus desensitizing the starting unit 20 which, except in case of an exceptionally severe swing or an immediately following fault or a sustained fault, opens its contacts 61 and closes its contacts 56, thereby deenergizing the ohm unit 19 and the timing unit 18. In the exceptions noted tripping is blocked. Due to the free return action of the timing unit, the contact 9 thereof is reclosed before the opening of the contacts 38 which may have an appreciable wipe, thus maintaining the insensitive condition of the starting unit so that, for example swings following the operation of the fault responsive relays which eliminated a faulty portion of the system do not cause operation but faults can.

In the illustrated embodiment of our invention we have, for the sake of simplicity, shown but one distance relay for one phase of the system. It will be obvious, however, to those skilled in the art that similar relays will be provided for the other phases of the system.

While we have shown and described our invention in considerable detail, we do not desire to be limited to the exact arrangements shown but seek to cover by the appended claims all those modifications that fall within the true spirit and scope of our invention.

What we claim as new and desire to secure by Letters Patent of the United States, is:

1. In combination, an electric circuit, a fault responsive graded time action relay connected to be energized from said circuit and means operative substantially immediately in response to a fault for varying the initial sensitivity of said relay and for restoring the initial sensitivity after the lapse of one of the graded times of operation thereof.

2. In combination, an electric circuit, a fault responsive graded time action relay connected to be energzed from said circuit, means operative substantially immediately in response to a fault for increasing the initial sensitivity of said relay and means for restoring the initial sensitivity of the relay at the end of one of the graded times of operation thereof.

3. In combination, an electric circuit, a fault responsive graded time action relay connected to be energized from said circuit and including a timing element operative substantially immediately on the occurrence of a fault to vary the initial sensitivity of said relay and means for restoring the initial sensitivity of said relay after the lapse of one of the graded times of operation thereof.

4. In combination, an electric circuit, a stepped time action directional distance relay connected to be energized from said circuit and including a timing element operative substantially immediately on the occurrence of a fault to increase the initial sensitivity of said relay and means for restoring the sensitivity of said relay after the lapse of the maximum time of operation of the relay.

5. In combination, an electric circuit, a stepped time action directional distance relay connected to be energized from said circuit and including a timing means operative substantially immediately on the occurrence of a fault for increasing the initial sensitivity of said relay and for restoring the initial sensitivity of the relay after the maximum time of operation thereof.

6. In combination, an electric circuit, a fault responsive stepped time action directional distance relay comprising a timing unit and a starting unit and means actuated by the timing unit substantially immediately on the occurrence of a fault for increasing the initial sensitivity of the starting unit and for restoring the initial sensitivity after the timing unit has operated a predetermined time.

7. In combination, an electric circuit, a fault responsive stepped time action directional distance relay comprising a timing unit, an ohm unit and a starting unit and means for increasing the sensitivity of the starting unit immediately following the operation thereof and means for restoring the initial sensitivity of the relay after the timing unit has operated a predetermined time.

8. In combination, an alternating current electric circuit subject to faults and power swings, fault responsive relay means connected to be energized from said circuit for controlling the circuit on the occurrence of faults, and means dependent on the difference in time required by power swings and faults to reach the electrical conditions of the circuit necessary to operate the relay means for causing said relay means to distinguish between power swings and faults.

9. In combination, an alternating current electric circuit subject to faults and power swings, fault responsive relay means connected to be energized from said circuit for controlling the circuit on the occurrence of faults, and means controlled by said relay means operative in accordance with the difference in time required by power swings and faults to reach the electrical conditions of the circuit necessary to operate the relay means for permitting operation of said relay means during faults and preventing operation on power swings.

10. In combination, an electric circuit and a fault responsive graded time action distance relay comprising a starting unit and timing means controlled by the starting unit operative substantially immediately on the occurrence of a fault for increasing the sensitivity thereof.

11. In combination, an electric circuit, a fault responsive stepped time action directional distance relay comprising a timing unit and a starting unit and means for varying the angle of maximum torque of the starting unit after the timing unit has operated a predetermined time.

12. In combination, an electric circuit, a fault responsive stepped time action directional distance relay comprising a timing unit and a starting unit and means controlled by the starting unit for decreasing the angle of maximum torque thereof immediately following the operation of the starting unit.

13. In combination, an electric circuit, a fault responsive graded time action distance relay comprising a starting unit and means controlled by the starting unit for varying the angle of maximum torque thereof.

14. In combination, an electric circuit, a fault responsive stepped time action directional distance relay comprising a time unit and a starting unit and means for increasing the angle of maximum torque of the starting unit after the timing unit has operated a predetermined time.

15. In combination, an alternating current electric circuit and a fault responsive graded time action distance relay comprising a starting unit, a timing unit, a first means controlled by said timing unit operative in one position to establish a predetermined initial sensitivity of the starting unit and to another position to change the sensitivity of the starting unit upon operation thereof, and another contact means controlled by the timing unit operative at the expiration of one of the graded times of the relay to restore and to maintain the initial sensitivity of the relay until said first means is returned to its said one position.

16. In combination, an alternating current electric circuit and a fault responsive graded time action distance relay comprising a starting unit, a timing unit controlled thereby, a first contact means controlled by said timing unit operative in one position to establish a predetermined initial sensitivity of the starting unit and to another position to increase the sensitivity of the starting unit upon operation thereof, and another contact means controlled by the timing unit operative at the expiration of the maximum of the graded times of the relay to restore and to maintain the initial sensitivity of the relay until said first contact means is returned to its said one position.

17. In combination, an alternating current electric circuit and fault responsive distance relay means including a starting unit, and means for causing said relay to distinguish between power faults and swings including means operative from the initial operation of the starting unit and until the expiration of the expected maximum fault duration for rendering the starting unit more sensitive.

18. In combination, an alternating current electric circuit and a fault responsive graded time action distance relay comprising a starting unit having an initial sensitivity greater than the maximum expected energy oscillation of the circuit and less than the expected fault value of energy, means for increasing the initial sensitivity of the starting unit substantially immediately upon the occurrence of conditions causing the operation of said starting unit to maintain said starting unit in operated position under fault conditions for a predetermined time, and means for subsequently restoring said initial sensitivity.

OLIVER C. TRAVER.
CHARLES R. MASON.